Dec. 29, 1959 R. D. LEMMERMAN 2,918,984
SOUND CONTROL SHROUD FOR AIRCRAFT ENGINES
Filed Oct. 8, 1953 3 Sheets-Sheet 1

INVENTOR.
RICHARD D. LEMMERMAN
BY
*Lindsey and Prutzman*
ATTORNEYS

Dec. 29, 1959  R. D. LEMMERMAN  2,918,984
SOUND CONTROL SHROUD FOR AIRCRAFT ENGINES
Filed Oct. 8, 1953  3 Sheets-Sheet 2

INVENTOR.
RICHARD D. LEMMERMAN
BY
Lindsey and Pritzman
ATTORNEYS

Dec. 29, 1959   R. D. LEMMERMAN   2,918,984
SOUND CONTROL SHROUD FOR AIRCRAFT ENGINES
Filed Oct. 8, 1953   3 Sheets-Sheet 3

INVENTOR.
RICHARD D. LEMMERMAN
BY
Lindsey and Prutzman
ATTORNEYS

United States Patent Office 2,918,984
Patented Dec. 29, 1959

2,918,984

SOUND CONTROL SHROUD FOR AIRCRAFT ENGINES

Richard D. Lemmerman, West Hartford, Conn., assignor, by mesne assignments, to Koppers Company, Inc.

Application October 8, 1953, Serial No. 384,808

3 Claims. (Cl. 181—42)

The present invention relates generally to sound control devices and, more particularly, to a sound control device for use with aircraft engines to reduce the amount of noise radiated to the aircraft fuselage or cabin.

In the use of aircraft for transporting passengers, one of the serious problems encountered is the great amount of noise created by the engines and propellers which at some frequencies may have physiological consequences and at the usual speech frequencies interferes with conversation and causes much annoyance to the passengers. The aforesaid problem has been rendered acute by the present-day trend toward the use of aircraft engines deriving some or all of their power from the exhaust of the engine. Such engines, for example, may be piston engines having augmenter tubes on the exhaust system or turbo-propeller engines or conventional gas turbine engines. With the use of such engines, additional thrust is obtained by directing the exhaust gases rearwardly and parallel to the fuselage of the aircraft and it has been found that the exhaust system radiates considerable noise to the fuselage or cabin, rendering the noise level highly objectionable even in modern soundproofed cabins and making effective sound treatment a necessity.

In controlling the noise radiated by the exhaust system of engines of the type referred to it is important to avoid any undesirable effect upon the exhaust gas stream itself which would decrease efficiency and reduce the thrust obtained. Also it is essential to utilize a sound treatment device which itself is compatible aerodynamically with the design of the airplane and which is structurally acceptable from a size and strength standpoint.

Accordingly it is an aim of the present invention to provide a sound control device for aircraft engine exhaust systems which will not have a material undesirable effect upon the exhaust stream, which will be compact and of small size so as to be adapted for incorporation in conventional aircraft structures, which is aerodynamically designed so that it will not have an undesirable effect upon the performance of the aircraft, which is structurally strong and rugged so that it does not require additional supporting structures and will not deteriorate in use, which is relatively simple to fabricate, assemble and install using conventional techniques, and which will effectively reduce the noise level at the fuselage or cabin, particularly at speech interference frequencies.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
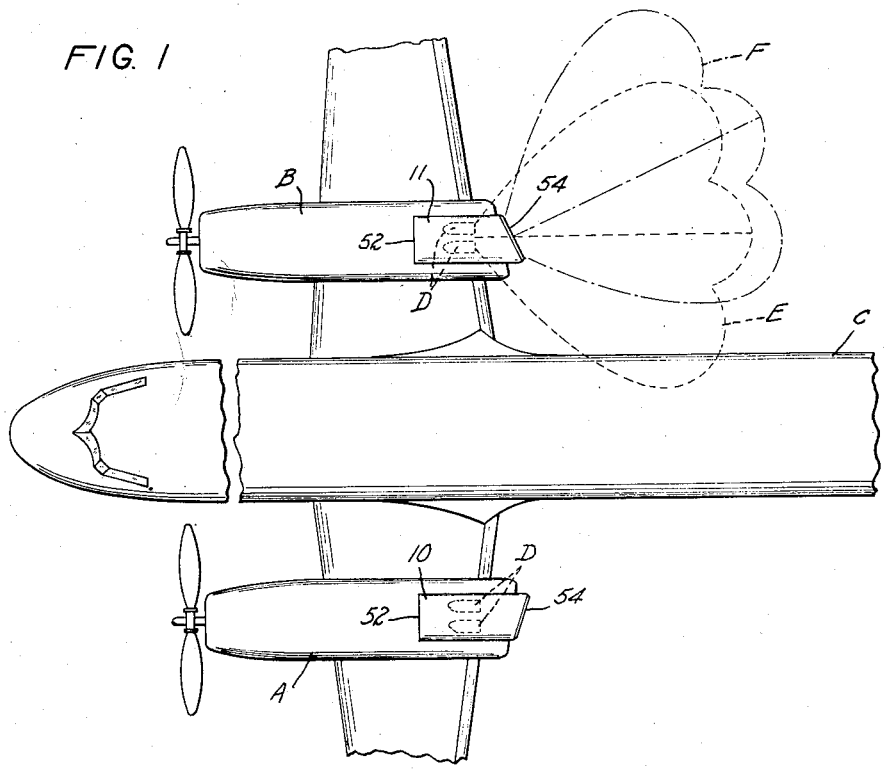
Fig. 1 is a fragmentary top view of an aircraft having installed thereon an embodiment of the sound control shrouds of my invention.
Figure 2:
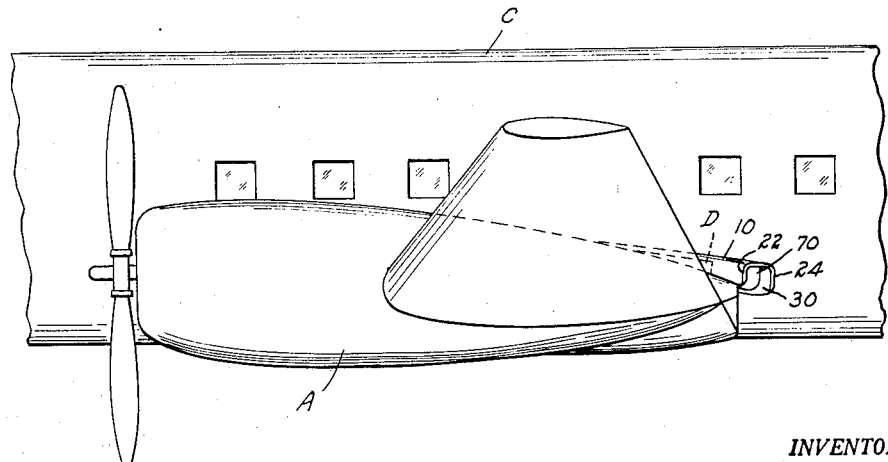
Fig. 2 is a fragmentary side view of the aircraft shown in Figure 1.

Referring to the drawings in detail, there is shown in Figures 1 and 2 a typical commercial aircraft to which the present invention may be applied. In the particular illustration there has been selected a Convair Model 340 airplane which is a two-engine plane as indicated by the two engine nacelles A and B, and having the usual fuselage or cabin C for seating the passengers transported by the aircraft. In this particular type of aircraft, each of the engine nacelles is provided with a pair of rearwardly extending augmenter tubes D (sometimes referred to as an augmenter stack) which protrude from the upper surface of the nacelle and extend rearwardly so as to direct the exhaust stream in a direction which is generally parallel to the fuselage or cabin C.

In order to illustrate and explain the present invention there has been depicted in Figure 1 in dotted lines denoted by the reference letter E a typical sound radiation pattern radiated by the augmenter tubes prior to sound control treatment in accordance with the present invention. It will be appreciated that the dotted line E indicates a line of constant sound level and is merely a two-dimensional illustration. Actually, the radiation pattern is three-dimensional so that the plotting of the points of constant sound level would actually be heart-shaped in form. Also, the complete radiation pattern will contain numerous lines of constant sound level increasing in intensity toward the center of the configuration and decreasing of intensity exteriorly of the configuration shown in the drawing. In general, the noise level in the aircraft fuselage or cabin for aircraft of the type illustrated in Figures 1 and 2 will be of the order of 50 to 100 decibels in the normal speech interference range of frequencies, generally regarded as 600 to 4800 c.p.s., and will vary to some degree, depending upon the specific location in the fuselage or cabin where the sound measurements are being made.

In accordance with the present invention and as described more particularly hereinafter, the typical sound radiation pattern of the aircraft engine is displaced or distorted as shown diagrammatically by the dot and dash line F so as to place the aircraft fuselage or cabin in lines of lesser sound level, thereby reducing the sound level in the fuselage or cabin to a degree greatly increasing the comfort and convenience of the passengers.

In accordance with the invention, the sound radiation pattern is distorted and deflected so as to increase the passenger comfort in the fuselage or cabin by means of shrouds constructed in accordance with the invention and mounted in cooperating relationship with the augmenter tubes or other exhaust tubes of the engine. In the particular embodiment shown in the drawings, the shrouds 10 and 11 are mounted on the rear of the engine nacelles A and B respectively. The shrouds 10 and 11 are identical except for the facing direction of the rear opening of the shroud, depending upon on which side of the aircraft the same is mounted.

Figure 3:
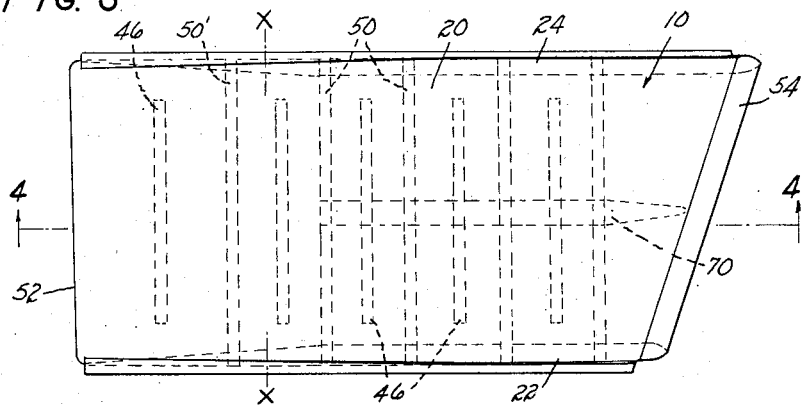
Fig. 3 is an enlarged top view of the shroud.
Figure 4:
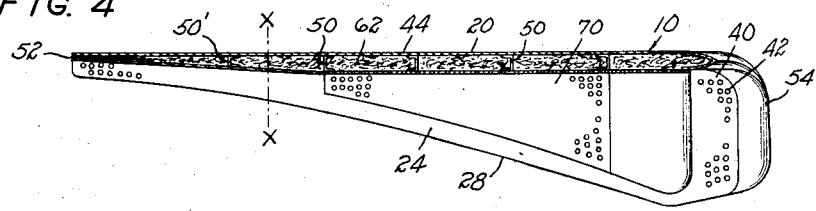
Fig. 4 is a cross-sectional view taken along the line 4—4 of Figure 3.
Figure 5:
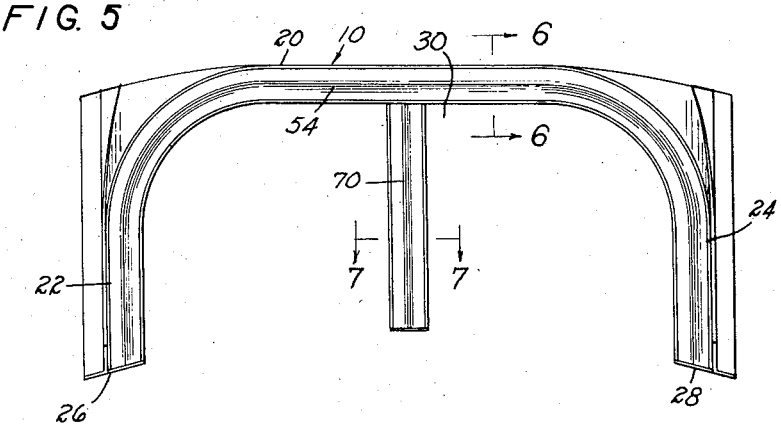
Fig. 5 is a rear view of the shroud.

Referring more particularly to Figures 3–5 of the drawings, it will be seen that the shroud 10 consists of a top wall 20 and side walls 22 and 24, which preferably are formed as shown in the drawings as a continuous uninterrupted wall, gradually curved at the intersection of the top and sides. The bottoms of the side walls 22 and 24 are adapted to seat upon the upper surface of the engine nacelles and therefore have lower edges 26 and 28 which are curved in accordance with the curvature of the particular engine nacelle with which the shroud is to be utilized. The outboard side wall 22 extends approximately to the trailing edge of the engine nacelle, while the inboard side wall 24 is extended beyond the trailing edge in order to form an outlet opening 30, whose axis is angularly related to the longitudinal axis of the plane, and particularly the axis of the fuselage or cabin C. In accordance with the invention, the axis of the opening 30, i.e., the direction in which it faces, may be varied depending upon the results which it is desired to obtain and the constructional limitations of the aircraft. In general, the greater the angle between the axis of the opening 30 and the longitudinal axis of the fuselage, the greater will be the reduction in the sound level at the fuselage. On the other hand, the extent to which the side wall 24 may project rearwardly from the engine nacelle is distinctly limited for structural reasons, as well as for aerodynamic reasons. In general, it is desirable to limit the rearward projection of the side wall 24 beyond the trailing edge of wall 22 to an extent just sufficient to accomplish the desired noise reduction. In the specific embodiment shown in the drawings, the side wall 24 extends rearwardly approximately 5 feet from the line X—X, while the corresponding length of the side wall 22 is approximately 4 feet.

It also will be appreciated that the top wall of the shroud 10 is inclined downwardly relative to the longitudinal axis of the cabin C. This is desirable because the axis of the outlet opening 30 is thereby tilted downwardly with respect to the axis of the fuselage or cabin, and this also assists in the desired displacement of the radiation pattern.

In accordance with the invention, the shroud 10 is dimensioned in cross section so that it will completely envelop the exhaust opening, which in this case compresses the two augmenter tubes D. In addition to enveloping the exhaust outlet of the engine, it is desirable that the shroud be of sufficient size so that the acoustical treatment thereof which is to be described hereinafter will withstand the gas velocities and temperatures occurring in the exhaust stream.

The cross-sectional configuration of the shroud 10 is not critical except for aerodynamic reasons. In the specific embodiment shown in the drawings, the shroud is flattened at the top (approximately twice as wide as it is high) and merges forwardly with the upper surface of the engine nacelle, thus making the installation efficient from an aerodynamic standpoint. Insofar as the acoustical operation of the shroud is concerned, the forward portion of the shroud 10, such as that portion forward of the line X—X in Figures 3 and 4 of the drawings, is not essential, and in fact it may be desirable in some installations to omit the forward portion, so that ambient air can enter the forward end of the shroud, thus reducing the temperature and rendering the temperature resistance of the interior of the shroud less critical. However, in most cases the projection of a shroud forwardly of the exhaust opening so that it will merge with the upper surface of the engine nacelle is preferred from an appearance standpoint and is more efficient aerodynamically. Although this increases the interior temperatures encountered in the shroud, nonetheless these temperatures in the embodiment shown in the drawings will not exceed that to which the interior surface of the shroud may be subjected when properly constructed in accordance with the present invention.

In order to avoid any undesirable back pressure on the engine exhaust, it will be observed that the side walls 22 and 24 gradually increase in height from front to back, so that the passageway through the shroud will increase rearwardly from the exhaust. In the specific embodiment shown in the drawings the shroud is dimensioned so that the outlet opening 30 is approximately 3 feet wide and 1½ feet high, whereas the augmenter tubes are only approximately 1 foot in diameter. Also it will be appreciated that although the outlet opening 30 no longer faces directly rearwardly of the aircraft, and has its axis angularly related to the axis of the fuselage or cabin, nonetheless there is no appreciable change of direction imparted to the air stream, nor is there any appreciable obstruction thereto, with the result that the efficiency and thrust obtained from the exhaust system is not materially affected.

In accordance with the invention, the shroud 10 is effective for distorting the sound radiation pattern not only because of its configuration as described above, but also because it is lined acoustically with material which is acoustically absorbent over the sound frequencies, namely, speech frequencies, which it is desired to control. To this end, the shroud is lined acoustically to provide a good impedance match, permitting the shroud to become the primary radiator of the sound and to radiate the sound in its own distinctive pattern.

Figure 6:
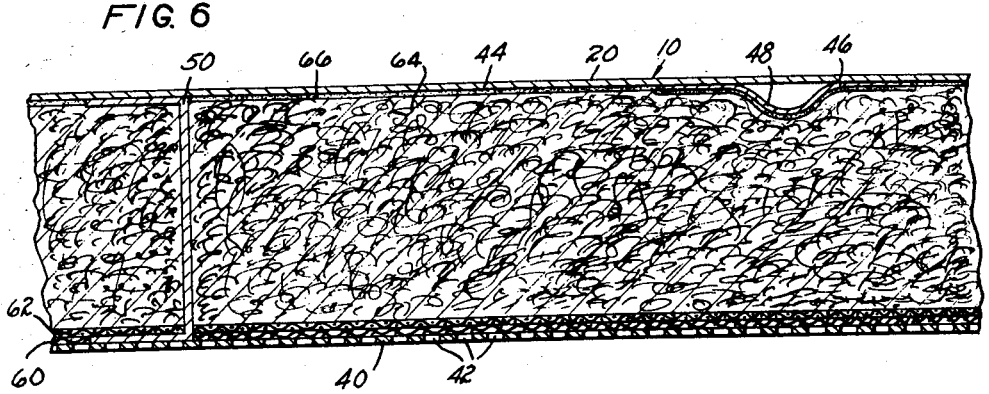
Fig. 6 is a cross-sectional view taken along the line 6—6 of Figure 5.

In accordance with the invention, an effective acoustic surface for the interior of the shroud may be provided as best shown in Figure 6 of the drawings. Referring to Figure 6, the interior surface of the top wall 20 and side walls 22 and 24 is formed of a continuous metal sheet 40 which is of relatively heavy gage, and which is perforated throughout with openings 42. In the event the temperatures encountered in the shroud are excessive, it is preferred to use a sheet 40 which is formed of heat-resistant metal, such as stainless steel. On the other hand, if the temperatures encountered are not excessive, particularly where the forward end of the shroud is open to ambient air, then it is possible to use sheet metal which has a lesser resistance to heat, such as aluminum. Perforated sheet metal having a gage of the order of 14 to 22 is generally acceptable.

The exterior of the shroud is composed of a single sheet of imperforate metal, and since the exterior is not subjected to excessive temperatures, this sheet is preferably composed of a light metal, such as aluminum. The gage of this outer sheet 44 is not critical, except that it should be sufficiently rigid to avoid undue flutter and vibration. Actually, the rigidity of the sheet 44 may easily be increased, as illustrated in Figures 3 and 6 of the drawings, by welding transverse reinforcing strips 46 to the interior surface of the sheet 40 within the top wall 20. The strips 46 which are formed with an integral center rib or ridge 48 serve admirably for this purpose.

The interior sheet 40 and outer sheet 44 are disposed in spaced-apart parallel relationship and supported by means of struts 50 which are U-shaped in cross section and may be welded along their edges to the facing surfaces of the interior and outer sheets, and these struts 50 impart the necessary rigidity and shape to the shroud. Since the forward portion of the shroud forwardly of the line X—X is not important from a sound treatment standpoint, it is preferred to permit the interior sheet 40 and outer sheet 44 to merge at the forward edge 52. For this purpose the strut 50' is made somewhat smaller than the remaining struts 50. The trailing edge of the shroud is formed by a lip 54 consisting of a V-shaped strip of metal which is welded to the trailing edge of the interior sheet 40 and outer sheet 44 and forms a smooth joinder therewith.

Immediately in back of the inner sheet 40 is a layer of glass fiber cloth 60 which is highly resistant to elevated temperatures and to the erosion of the exhaust stream. Overlying the glass fiber cloth is a sheet of wire screening 62 which is of conventional open mesh construction. Preferably a stainless steel wire mesh having a mesh size of the order of 14 to 18 is used. The screening 62 assists in providing resistance to the erosion of the exhaust gases. The main filling material between the interior sheet 40 and outer sheet 44 is a layer of sound-absorbing material 64 which preferably is fibrous in character and formed of material which is heat-resistant. Material which I have found to be particularly suitable for this use is glass fiber wool of the type known in the trade as TWF and packed to a density of approximately 6 pounds. The interior surface of the outer sheet 44 is preferably coated with a layer of mastic 66 which can be any of the conventional coating compounds, usually of a bituminous base, which serves the function of damping the structure. In the specific embodiment shown in the drawings, the interior sheet 40 and outer sheet 44 are spaced approximately two inches apart, which results in a flow resistance of approximately 80 rayles at the frequencies of speech level. Such flow resistance gives the impedance which provides the necessary impedance match for efficient operation of the shroud.

Figure 7:
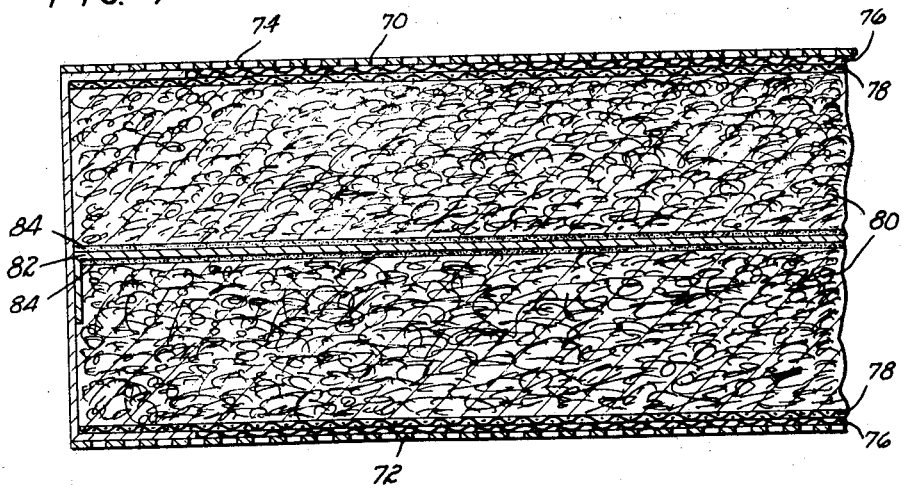
Fig. 7 is a cross-sectional view taken along the line 7—7 of Figure 5.

In the specific embodiment shown in the drawings, the shroud is considerably wider than it is high, in order to accommodate the two augmenter tubes in a single shroud. In this arrangement it is preferred to reinforce the shroud by means of a center baffle 70. The center baffle extends between the upper wall 20 and the nacelle of the engine, and it is generally triangular in shape as best shown in Figures 3 and 4 of the drawings. In accordance with the invention, the center baffle 70 also is faced with acoustically absorbent material. The interior construction of the baffle 70 is best shown in Figure 7 of the drawings. Referring to Figure 7, it will be seen that the baffle 70 consists of two side plates 72 and 74 which are formed of the same material as the interior sheet 40 of the walls of the shroud, and similarly perforated. Interiorly of each of the side plates 72 and 74 there is disposed a layer of glass fiber cloth 76 and wire screening 78. The main filler material is again a fibrous acoustically-absorbent material 80 such as fiber glass. Disposed centrally of the baffle 70 and extending longitudinally thereof is a center divider panel 82 which is coated on either side by a layer of mastic 84. In brief, the interior construction of the baffle 70 is substantially the same as though two sections of the walls 20, 22 and 24 were placed back to back.

As a result of the present invention it is possible in commercial application to reduce the noise level in the cabin or fuselage of the aircraft by as much as 2 to 7 decibels at the speech interference range. As will be appreciated, this provides a very marked reduction in the noise level, since the energy required by a passenger to make his voice heard above the noise level of the cabin is nearly twice as great when the aircraft does not have installed thereon the sound control device of the present invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A sound control device for use with aircraft of the type having a cabin and an engine nacelle situated generally parallel to the cabin provided with augmenter tubes emerging from the upper surface of the nacelle and facing in a direction generally parallel to the longitudinal axis of the cabin comprising a shroud having a cross section in the form of an inverted U and having side walls increasing in height from front to back adapted to be fixed to the upper surface of the nacelle and adapted to extend generally parallel throughout to the longitudinal axis of the cabin to form a substantially unobstructed and straight expanding gas passageway adapted to extend rearwardly from the augmenter tubes for releasing the exhaust in a stream substantially aligned with the augmenter tubes, the inboard side wall of the shroud being longer than the outboard side wall to form a mouth adapted to be positioned in alignment with the first agumenter tubes but angularly related with respect to the cabin to divert the sound at an angle to the longitudinal axis of the cabin without substantially altering the axial flow of the exhaust gases, said shroud being formed of an outer shell of imperforate sheet material and an inner shell of perforated sheet metal, said shells being spaced apart and containing a layer of acoustically-absorbent material therebetween.

2. A sound control device for use with aircraft of the type having a cabin and an engine nacelle situated generally parallel to the cabin provided with augmenter tubes emerging from the upper surface of the nacelle and facing in a direction generally parallel to the longitudinal axis of the cabin, comprising a shroud having a cross section in the form of an inverted U and having side walls increasing in height from front to back adapted to be fixed to the upper surface of the nacelle and adapted to extend generally parallel throughout to the longitudinal axis of the cabin to form an expanding gas passageway adapted to extend rearwardly from the augmenter tubes for release of the exhaust in a stream substantially aligned with the augmenter tubes, the side wall of the shroud inboard of the nacelle being longer than the outboard side wall to form a mouth adapted to be positioned in alignment with the augmenter tubes but angularly related with respect to the cabin to divert the sound at an angle to the longitudinal axis of the cabin without substantially altering the axial flow of the exhaust gases, and said shroud having an inner surface formed of perforated sheet metal, a layer of glass fiber cloth over the perforated sheet metal, a layer of metal wire screening over the layer of glass fiber cloth, a relatively thick layer of glass fiber over the screening, and an outer surface formed of imperforate sheet material.

3. A sound control device for use with aircraft engines comprising a shroud having a cross section in the form of an inverted U and consisting of continuously formed side walls and a top wall, said top wall being of substantially constant width and said side walls being substantially straight throughout and of unequal length and higher at the rear end than at the front end to form a straight channel of substantially constant width but of increasing depth, terminating in an open end forming a substantially unobstructed release passageway for release of the exhaust gases without substantial change of direction and in alignment with the longitudinal axis of the shroud, said shroud having its terminal edge extending diagonally of the longitudinal axis of the shroud to divert the sound at an angle to the longitudinal axis of the shroud without substantially altering the axial flow of the exhaust gases, said walls being formed of an inner shell of perforated sheet metal and an outer shell of imperforate sheet material separated by a layer of acoustically-absorbent material.

References Cited in the file of this patent

UNITED STATES PATENTS

| | | |
|---|---|---|
| 1,874,406 | Wright | Aug. 30, 1932 |
| 2,096,260 | Pavillon | Oct. 19, 1937 |
| 2,122,447 | Zand | July 5, 1938 |
| 2,172,851 | Reynolds | Sept. 12, 1939 |
| 2,225,650 | McCurdy | Dec. 24, 1940 |
| 2,488,174 | Clegern | Nov. 15, 1949 |

(Other references on following page)

UNITED STATES PATENTS

| | | |
|---|---|---|
| 2,519,160 | Tucker | Aug. 15, 1950 |
| 2,543,461 | Latulippe | Feb. 27, 1951 |
| 2,583,366 | Engels | Jan. 22, 1952 |
| 2,601,963 | Boutelle | July 1, 1952 |
| 2,625,235 | Caulkins | Jan. 13, 1953 |
| 2,674,335 | Lemmerman | Apr. 6, 1954 |
| 2,674,336 | Lemmerman | Apr. 6, 1954 |
| 2,720,276 | Droeger | Oct. 11, 1955 |

FOREIGN PATENTS

| | | |
|---|---|---|
| 258 of 1913 | Great Britain | July 3, 1913 |
| 349,239 | Great Britain | May 28, 1931 |
| 465,071 | Great Britain | Apr. 30, 1937 |
| 102,901 | Australia | Jan. 4, 1938 |
| 551,547 | Great Britain | Mar. 1, 1943 |
| 653,544 | Great Britain | May 16, 1951 |

UNITED STATES PATENT OFFICE

CERTIFICATE OF CORRECTION

Patent No. 2,918,984                         December 29, 1959

Richard D. Lemmerman

It is hereby certified that error appears in the printed specification of the above numbered patent requiring correction and that the said Letters Patent should read as corrected below.

Column 3, lines 38 and 39, for "compresses" read -- comprises --.

Signed and sealed this 14th day of June 1960.

(SEAL)
Attest:

KARL H. AXLINE                                         ROBERT C. WATSON
Attesting Officer                                      Commissioner of Patents